July 15, 1969     H. A. DAVIES ET AL     3,455,720
POST-FORMABLE FILM
Filed Aug. 21, 1964
MOISTURE AND OXYGEN IMPERMEABLE, AND/OR
HEAT-SEALABLE COATING.
BIAXIALLY ORIENTED, HEAT SET POLYETHYLENE
TEREPHTHALATE BASE FILM CONTAINING 3-8 MOL
PERCENT OF DIETHYLENE GLYCOL.
INVENTORS
HOWARD ARTHUR DAVIES
MICHAEL KARICKHOFF
BY
ATTORNEY

United States Patent Office 3,455,720
Patented July 15, 1969

3,455,720
POST-FORMABLE FILM
Howard Arthur Davies, Buffalo, N.Y., and Michael Karickhoff, Circleville, Ohio, assignors to E. I. du Pont de Nemours and Company, Wilmington, Del., a corporation of Delaware
Continuation-in-part of abandoned application Ser. No. 154,347, Nov. 22, 1961. This application Aug. 21, 1964, Ser. No. 391,310
Int. Cl. B29d 7/22; C09j 7/00
U.S. Cl. 117—7                    5 Claims

ABSTRACT OF THE DISCLOSURE

Polyethylene terephthalate film containing from 3 to 8 mol percent of diethylene glycol is stretched in the machine direction from 2.5X to 2.9X at a film temperature within the range of 85–100° C., and in the transverse direction from 2.7X to 2.9X at a film temperature of within the range of 88–120° C., and is thereafter heat set under tension at a temperature within the range of 130–155° C. The resulting post-formable film has an $F_{80}$ value in the machine direction of 10,000 to 18,000 p.s.i. and an $F_{80}$ value in the transverse direction of 12,000 to 18,000 p.s.i., and a transverse direction shrinkage no greater than 3% at 100° C. in water. Preferably the film is coated with a moisture and oxygen impermeable, and/or heat-sealable polymeric coating.

---

This application is a continuation-in-part of our copending application Ser. No. 154,347, filed Nov. 22, 1961.

This invention relates to synthetic organic polymeric film and more particularly to post-formable polyethylene terephthalate film and to the method of producing such film.

The production of the novel class of film and fiber forming polyesters of terephthalic acid and a glycol of the Series HO $(CH_2)_nOH$ where $n$ is an integer from 2 to 10, inclusive, is fully disclosed in U.S. Patent No. 2,465,319 to Whinfield and Dickson. From a commercial standpoint, one of the most attractive polymers of this class is polyethylene terephthalate. Polyethylene terephthalate film, when highly oriented and fully heat-treated, i.e., film stretched substantially the same amount in both directions (e.g., at least 3X, where X is the original dimension of the film) and heat-treated (heat-set) at elevated temperatures (e.g., 150–220° C.), possesses a unique combination of electrical, chemical, and physical properties which make it outstanding for a great variety of commercial end uses. However, commercially available polyethylene terephthalate film has not found widespread acceptance in applications which require the film to be post formed into shaped articles of manufacture such as the conversion of post-formable film into flexible packages to preserve perishable foods because of excessive film failures (ruptures) occurring in the conventional vacuum forming operation.

It is an object of this invention, therefore, to provide an oriented polyethylene terephthalate film which is capable of being satisfactorily thermo (post) formed into flexible articles of manufacture. It is a further object to provide a coated oriented polyethylene terephthalate film which is capable of being post formed into flexible articles of manufacture having imparted on the outer surface thereof a continuous, strongly adhered, heat-sealable coating. It is a still further object to provide a process for the manufacture of an oriented polyethylene terephthalate film which is capable of being satisfactorily post formed into flexible article of manufacture. The foregoing and related objects will more clearly appear from the detailed description which follows.

These objects are realized by the present invention which, briefly stated, comprises heating film of substantially amorphous polyethylene terephthalate containing from 3 to 8 mol percent of diethylene glycol at a temperature of from 85 to 100° C., stretching said film in the longitudinal direction (i.e., direction of extrusion or machine direction) from 2.5 to 2.9X where X is the original dimension of the film in the direction of stretch, and stretching said film, heated at a temperature of from 88 to 120° C., in the transverse (perpendicular) direction from 2.7 to 2.9X and thereafter heat-setting the stretched film at a temperature of from 130 to 155° C. while holding the film under tension whereby to produce post-formable oriented polyethylene terephthalate film characterized by having:

(1) A longitudinal direction $F_{80}$ value of 10,000 to 18,000 p.s.i.;

(2) A transverse direction $F_{80}$ value of 12,000–20,000 p.s.i.;

(3) A shrinkage as measured in the transverse direction of no greater than 3.0% at 100° C. in water;

(4) A diethylene glycol content of 3 to 8 mol percent.

The present invention is predicated primarily upon the discovery that satisfactory post-formability of oriented polyethylene terephthalate film results when amorphous polyethylene terephthalate film is biaxially oriented and heat-treated under conditions such that the interdependent characteristics of $F_{80}$ values, diethylene glycol content, and shrinkage of the oriented, heat-treated film are within the critical ranges hereinafter defined.

The $F_{80}$ value is defined as the force in p.s.i. (pounds per square inch), calculated from a stress-elongation curve at an elongation of eighty percent. The $F_{80}$ value is measured at 74° C. and 45–50 percent relative humidity. Film samples are cut to 3" x 5" using a cutting die. The film is then further cut to 1" x 5" using a Thwing-Albert cutter. This is done to ensure nick free edges and thus minimize premature breakage. The thickness of the film sample is then determined by measurement with an Ames gauge or by weighing and calculation from the density. The sample is then placed in an Instron Tensile Tester. The initial jaw separation is 2 inches. The film is elongated at a constant rate of 2/in./min. (100%/min.) and the force is recorded on a strip chart which is also run at 2 in./min. Elongation is continued until the film fractures. The resultant curve is a force elongation curve. From this curve, break tensile, break elongation and $F_{80}$ are calculated, with the tensile values calculated on the basis of the initial cross sectional area. The break tensile is the force corresponding to the point where the film fractured. The break elongation is the elongation of fracture. The $F_{80}$ is the force at 80 percent elongation (based on original length). Under the conditions of the test, this corresponds to 1.6 inches along the elongation axis.

With respect to the first named characteristic it has been determined that the $F_{80}$ value measured in both the longitudinal directions of the film, hereinafter referred to as the $LDF_{80}$ and $TDF_{80}$ values, is a critical parameter in defining a post-formable polyethylene terephthalate film, and must be within the range of from 10,000–18,000 pounds per square inch (p.s.i.) as measured in the longitudinal direction and from 12,000–20,000 p.s.i. in the transverse direction. To obtain a film having the requisite $F_{80}$ values, it is necessary to stretch the film in both the longitudinal direction and transverse directions within a critically narrow range. If the film is stretched in the LD (longitudinal direction) or TD (transverse direction) to an extent beyond 2.9X, too high an orientation level will be reached with the result that the $F_{80}$ value will be too high and the formability will be seriously impaired by reason of excessive embrittlement of the film during the forming operation. If the film is stretched to an extent less than 2.5X, too low an orientation level will be attained with the result that the operability of the process and the physical properties of the film will be inferior. In addition the probability of gel particles being prominent in the stretched sheet and unusually high variations in thickness (gauge) occurring will be high.

The operable temperature ranges employed for LD stretching the film will depend upon the method used for longitudinal direction stretching. If an idler roll system (such as is shown, for example, in U.S. Patent 2,823,421) is employed, the operable LD stretching temperature range will be 90–100° C. Film heated above 100° C. will stick to the rolls and wrap around them causing nonuniform stretching. Film heated below 90° C. will neck-in excessively, edge-heavying will occur, and the film surface will be more prone to scratches. If a nip-roll type stretching device is used, the operable LD stretching temperature range will be 85–92° C. Above 92° C., the film will again stick to the roll creating lanes of irregular stretch. Below 85° C., the film will not stretch uniformly at the rates normally employed for stretching.

The film may be stretched to the required extent by stretching the film first in the transverse direction in a tentering device followed by longitudinal direction stretching in a nip-roll stretching apparatus such as described in U.S. Patent 2,823,421, or by stretching film first in longitudinal direction in an idler roll apparatus such as described in U.S. Patent 2,823,421 and thereafter stretching the film in the transverse direction in a tentering device similar to that described.

The preferred ranges for the process conditions necessary to produce the requisite physical property levels for films having optimum formability on the recently developed "deep draw" vacuum packaging machinery are as follows:

(1) Stretch ratio MD, 2.65±.05; TD, 2.70± .05.

(2) Stretch temperature (ambient) MD, 85– 97° C.; TD, 95–116° C.

(3) Heat set temperature 132–143° C.

At the temperatures employed for stretching in this process the rates of stretch may range from 500 percent per minute for thick gauge films, to 65,000 percent per minute for thin gauge films.

Another critical parameter in determining film permeability is the diethylene glycol level expressed in terms of mol percent. The level of DEG in polymeric ethylene terephthalate may be determined by a chromatographic method. The ratio of DEG to total diols present in polyethylene terephthalate is analyzed by gas chromatography. Polymer is saponified under essentially anhydrous conditions with potassium hydroxide (KOH) in the presence of n-butanol. Following saponification, excess KOH is precipitated with carbon dioxide. An aliquot of the cooled filtrate is analyzed by gas chromatography using hydrogen flame ionization detection. The amounts of ethylene glycol and diethylene glycol are determined by relating their peak areas to corresponding areas obtained with internal standards and expressed in terms of mol percent. For satisfactory forming characteristics on the vacuum packaging machinery utilized in industry today. It has been discovered that from 3–8 mol percent diethylene glycol must be present in the polymer employed in the subsequent film processing steps. A diethylene glycol (DEG) level in the polymer of less than 3 mol percent produces a film which does not have the requisite post-forming characteristics i.e. too high an $F_{80}$ level in either or both the longitudinal and transverse directions resulting in film embrittlement during the forming operation. DEG contents in excess of 8 mol percent tend to adversely affect the tensile properties of the film. The level of DEG in the polymer employed in the film process may be regulated by careful control of polymerization process conditions or by the inclusion of free diethylene glycol into the reaction mixture prior to substantial polymerization having taken place.

The process of the present invention, although, as illustrated by the examples to follow, is particularly effective in producing oriented polyethylene terephthalate films possessing excellent post-forming characteristics wherein the thickness of the stretched film lies between 0.5–2.0 mils, is applicable to polyethylene terephthalate films 0.25–10 mils thick. For some end uses, wherein it may be desirable to employ films of thickness greater than 10 mils, it is possible to prepare such films with good post-forming characteristics by compensating for the differences in rates of crystallization and requisite stretching forces in these thick gauge films by means of proper alteration of the process conditions.

For many end uses of the thermoformable film, such as in the manufacture of flexible packages to produce perishable foods, it is not only desirable, but at times necessary, to coat the base of polyethylene terephthalate film with an oxygen and moisture impermeable coating. In this connection the extent of transverse direction shrinkage at 100° C. in water is a significant parameter to insure good coating performance of the base film. Maximum TD shrinkage of 3.0% is acceptable. Experimental data show that such a film can be coated at speeds in excess of 125 yds. per minute. TD shrinkage (measured at 100° C.) below 1.5% is preferred since this enables the film to be coated at speeds of 170 yds. per minute or greater. A transverse direction stretch ratio between 2.65 to 2.8, in combination with the other above-specified requirements, produces a film with satisfactory shrinkage.

The base film of the process of the present invention may have imparted thereupon, as shown in the cross-sectional view of the accompanying drawing:

(1) A moisture and oxygen impermeable coating, and/or, (2) A heat-sealable coating readily adaptable to surface modifications as printing, etc.

As suitable moisture and oxygen impermeable coating compositions may be listed solid polymers prepared from at least 80% vinylidene chloride and 3 to 20% of at least one other polymerizable mono-olefinic comonomer. As polymerization monomers for use with the vinylidene chloride may be listed, methyl, ethyl, isobutyl, octyl and 2-ethyl hexyl acrylates and methacrylates: phenyl methacrylate, cyclohexyl methacrylate, p-cyclohexylphenyl methacrylate, methoxy ethyl methacrylate, chloroethyl methacrylate, 2-nitro-2-methyl propylmethacrylate, and the corresponding esters of an acrylic acid: methalpha-chloroacrylate, octylalpha - chloroacrylate, methylisopropenyl ketone, acrylonitrile, methacrylonitrile, methylvinyl ketone, vinyl chloride, vinyl acetate, vinyl propionate, vinylchloroacetate, vinyl bromide, styrene, vinyl anaphthalene, ethyl vinyl ether, N-vinylphthalimide, N-vinylsuccinimide, N-vinylcarbazole, isopropenyl acetate, acrylamide, methacrylamide or monoalkyl substitution products thereof, phenyl vinyl ketone, diethyl fumarate, diethylmaleate, methylene diethyl malonate, dichloro-vinylidene fluoride, dimethyl itaconate, dibutyl itaconate, vinyl pyridine, maleic anhydride, allyl glycidyl ether and other unsaturated aliphatic ethers described in U.S. Patent No. 2,160,943. These compounds may be described as vinyl or vinylidene compounds having a single $CH_2=C<$ group. The most useful ones fall within the general formula

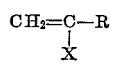

where R is selected from the group consisting of hydrogen, halogen and saturated aliphatic radicals, and X is a radical selected from the group consisting of

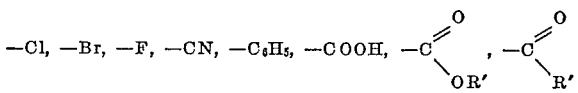

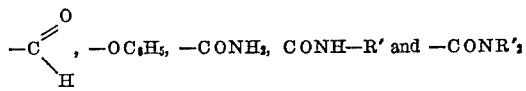

in which R' is alkyl.

The polymeric coating compositions employed as heat-sealable coatings for the post-formable polyethylene terephthalate film of the present invention are the polymers, i.e., homopolymers and copolymers, of alpha-olefins, such as polyethylene and copolymers of polypropylene and polybutylene, etc.

The coatings may be applied from aqueous or organic vehicles, i.e., in the form of aqueous dispersions or from solutions of the polymers and organic solvents, and may be applied in accordance with any known coating techniques. They may be applied, for example, by passing the film through a bath in a continuous manner or in a batch manner. Coatings may also be sprayed on the film, or applied manually by brushing or the like. The thickness of the coatings may be adjusted in accordance with methods well known in the coating art. Selection of the proper thicknesses of the coating depends to some extent on the properties that one desires to emphasize.

The following examples will serve to further illustrate the principles and practice of this invention.

EXAMPLE 1

Molten polyethylene terephthalate such as described in U.S. Patent No. 2,465,319 to Whinfield and Dickson and having an intrinsic viscosity of 0.54 and a diethylene glycol content of 5.6 mol percent was cast from a pressurized extrusion apparatus onto a water cooled quench drum at a throughput of 900 to 1000 pounds per hour. The temperature of the molten polymer was approximately 280° C. The extruded film was quenched by contact with the quench drum which was maintained at 40° C. The resultant cast film was approximately 0.04 inch thick and approximately 40 inches wide. This cast film was heated at a temperature of 94° C. and was then stretched in the longitudinal direction over an idler roll stretching apparatus such as is described in U.S. Patent 2,823,421 to an extent of 2.65X. After LD stretching, the film was heated at a temperature of 89° C. and was then stretched to an extent of 2.7X in a tentering device such as described in U.S. Patent 2,823,421 to Scarlett. Heat-treating of the film was accomplished by the heating of the film to a temperature of 132° C. while holding the film under tension in an extension of the tentering device. The resulting film had an $LDF_{80}$ value of 10,633 p.s.i., and a $TDF_{80}$ value of 12,316, a LD shrinkage in water at 100° C. of 1.26%, and a TD shrinkage in water at 100° C. of 0.45%. After heat-treating, the film was coated on one side with the copolymeric coating composition comprising 90% vinylidene chloride/10% of acrylonitrile and 1% based on the weight of vinylidene chloride and acrylonitrile of itaconic acid to confer impermeability to water vapor and oxygen. The resulting film was then subsequently top coated with a 3-mil coating of polyethylene by conventional melt extrusion methods. The coated film was converted into flexible packages on a Standard Packaging Company (614FS-1¾″ draw) Vacuum Packaging Machine. The coated film exhibited excellent formability and adaptability to this type of "deep-draw" vacuum packaging apparatus, exhibiting superior resistance to excessive shrinkage and rupture ("blow-out").

EXAMPLES 2 TO 12

These examples illustrate the criticality of the $LDF_{80}$ and $TDF_{80}$ content values, the diethylene glycol content and percent of TD shrinkage as measured at 100° C., in the preparation of post-formed polyethylene terephthalate film. In a manner identical to that described in Example 1, molten polyethylene terephthalate having in each case the indicated content of diethylene glycol and an intrinstic viscosity of 0.54 was cast from a pressurized extrusion apparatus onto a water cooled quench drum and was quenched by contact with the quench drum. In each example the cast film was stretched in the LD in a manner identical to that described in Example 1 and to the extent shown in Table I. After LD stretching, the film was stretched in a tentering device as in Example 1. The firms, each having a thickness of 0.5 mil, were then heat-treated in the extension of the tentering device while being held under tension at a temperature between 125 and 165° C. The heat-treated film samples were tested for such physical properties as LD and $TDF_{80}$, dimensional stability at 100° C. in water, and DEG content prior to being coated on one side with a 4.0 gram per square meter copolymeric coating composition comprising 90% vinylidene chloride, 10% acrylonitrile and 1% of itaconic acid (based on the weight of vinylidene chloride and acrylonitrile) such as is described in Example 1. The physical properties data for these films, the process conditions, and the post formability of the coated film on standard vacuum and heat package forming machinery after it had been top-coated with a 3-mil thickness of polyethylene as described in Example 1, are listed in Table I.

TABLE I.—PROCESS CONDITIONS AND PHYSICAL PROPERTIES OF POST-FORMABLE POLYETHYLENE TEREPHTHALATE FILM

| Example Number | Stretch Ratio LD | Stretch Ratio TD | Stretch Temperature, °C. LD | Stretch Temperature, °C. TD | Heat-Treating Temperature, °C. | LD F-80, p.s.i. | TD F-80, p.s.i. | Dimensional Stability in Water at 100° C. LD, percent | Dimensional Stability in Water at 100° C. TD, percent | Diethylene Glycol Content, mol percent | Formability on Vacuum Heat Packaging Machine |
|---|---|---|---|---|---|---|---|---|---|---|---|
| 2 | 2.90 | 2.80 | 94 | 89 | 155 | 17,300 | 19,300 | 1.40 | 1.40 | 5.7 | Fair.* |
| 3 | 2.83 | 2.76 | 89 | 101 | 149 | 15,000 | 17,066 | 1.40 | 1.32 | 6.5 | Good* |
| 4 | 2.75 | 2.78 | 89 | 101 | 148 | 15,733 | 17,533 | 1.56 | 1.72 | 6.0 | Do. |
| 5 | 2.65 | 2.70 | 92 | 101 | 132 | 10,633 | 12,316 | 1.26 | 0.45 | 5.6 | Do. |
| 6 | 2.65 | 2.75 | 93 | 104 | 138 | 11,767 | 13,133 | 1.04 | 1.84 | 5.1 | Do. |
| 7 | 2.65 | 2.89 | 91 | 102 | 136 | 12,200 | 15,767 | 2.04 | 1.92 | 6.0 | Do. |
| 8 | 2.55 | 2.78 | 90 | 101 | 134 | 11,812 | 16,632 | 2.40 | 1.60 | 5.0 | Do. |
| 9 | 2.74 | 2.58 | 89 | 103 | 138 | 12,167 | 10,933 | 1.88 | 1.24 | 5.4 | Poor. |
| 10 | 3.3 | 3.0 | 94 | 89 | 125 | 23,900 | 23,700 | 8.8 | 11.0 | 4.5 | Do. |
| 11 | 3.3 | 3.0 | 94 | 89 | 145 | 23,900 | 25,200 | 3.8 | 5.0 | 4.5 | Do. |
| 12 | 2.8 | 2.9 | 94 | 89 | 180 | 19,600 | | | | 5.5 | Do. |
| 13 | 2.8 | 2.8 | 89 | 101 | 134 | 17,900 | 20,500 | | | 2.0 | Do. |
| 14 | 2.8 | 2.8 | 89 | 101 | 134 | 18,250 | 21,000 | | | 1.5 | Do |

*Good on older type vacuum packaging machinery (draw, ½–1″); marginal on "deep-draw" machines (1½–1¾″).

As can be seen from Table I, a polyethylene terephthalate film (Examples 3 to 8) processed according to the specifications of the invention set forth hereinbefore exhibit all the characteristics necessary to produce a satisfactory post-formable film. In Examples 9 to 14 wherein the specifications of the process of the present invention were not adhered to, polyethylene terephthalate possessing poor post-forming characteristics were obtained. By introducing too low a level of orientation (stretching less than 2.7X TD) as evidenced in Example 9 by a $TDF_{80}$ value less than 12,000 p.s.i., or too high a level of orientation (stretching in excess of 2.9 LD or TD) as evidenced in Examples 10 and 11 by $LDF_{80}$ and $TDF_{80}$ values far in excess of 18,000 p.s.i., the ability to be converted into flexible formed packages by the conventional vacuum packaging machinery was seriously impaired. In Example 12, the heat-treating temperature was without the specified limits and a consequence of $LDF_{80}$ value far in excess of the 18,000 p.s.i. limit was obtained. In Examples 13 and 14 the diethylene glycol content is below the required specification and as a consequence, the $LDF_{80}$ and $TDF_{80}$ values are in excess of the maximum values, the film being brittle and incapable of being post-formed. In Example 2, the process conditions barely fall within the acceptable limits. The resulting coated film formed well on older types of vacuum packaging machinery wherein the draw was 1" or less, but performed marginally on the newer "deep-draw" equipment.

The process of the present invention provides a simple efficient, economical method for preparing heat-treated oriented polyethylene terephthalate film which is readily adaptable to post-forming processes. The product not only may be satisfactorily employed on all types of post-forming equipment (particularly those types employing a large degree of draw i.e., 1½–1¾") but also lends itself ideally to presurfacing modifications such as coating or metallizing. The development of this product paves the way for extensive use of polyethylene terephthalate films in a wide variety of packaging applications wherein the packaging film must be formed into a shaped article of manufacture by the use of vacuum-heat package forming equipment: a use hitherto not exploited by this type of film, despite its superior physical properties, because of its questionable post-forming characteristics. The polyethylene terephthalate films of the present invention may be employed for a wide variety of end uses. Among these may be listed: fenders for bicycles, tail-light reflectors, blister packages, interlayer for tubeless tires, vacuum formed food packages, containers and pouches, e.g. pouches for luncheon meats, cheese, frankfurters, etc., portion control cups, containers for jellies, baby foods and soups, frozen foods, skin packaging applications, typewriter ribbons, cook and serve food packages, stiffeners for waist bands of trousers, shirts, foundation garments, etc., and collar stays. A partially useful application for thick gauge postformable polyethylene terephthalate films lies in the manufacture of pleated and coiled films for use as decorative corrugated structures and as conductive, lightweight, corrosion resistant, leaf, coil, and torsion type springs. These spring devices, which are functional over a wide range of elongation and demonstrate such desirable properties as extendability, retractability and constant tensions find utility in a multitude of commercial applications. For example, in the form of sheet spring, this device may be used in safety devices, door and window closures, room dividers, rollerless window shades, toothed drive shafts, suspension packaging, shock-absorbing straps, and temperature-moisture sensing devices. Other spring types are capable of providing extendable "snap" antennas, compressible weather stripping and retractable wiring and circuiting. Slats for venetian blinds may be made from transparent post-formable polyethlene terephthalate film which has been vacuum metallized.

What is claimed is:
1. An oriented heat-set polyethylene terephthalate film capable of being post-formed into flexible articles of manufacture characterized by having: a thickness of not more than 10 mils, an $F_{80}$ value measured in the longitudinal direction of the film of from 10,000 to 18,000 pounds per square inch, an $F_{80}$ value measured in the transverse direction of the film of 12,000–20,000 pounds per square inch, a shrinkage measured in the transverse direction of the film of not greater than 3.0% at 100° C. in water, and a diethylene glycol content ranging between 3 to 8 mol percent.

2. The film of claim 1 having on at least one surface thereof a heat-sealable coating consisting essentially of a solid polymer of an alpha-olefin.

3. The film of claim 2 wherein the coating is polyethylene.

4. The film of claim 1 having on at least one surface thereof a coating comprising essentially a copolymer containing from 80 to 97% by weight, based on the total weight of the copolymer, of vinylidene chloride, and from 20 to 3% by weight of at least one other polymerizable olefin copolymerizable therewith.

5. The film of claim 4 wherein said copolymer contains 90% by weight of vinylidene chloride, 10% by weight of acrylonitrile, and 1% by weight, based on the total weight of vinylidene chloride and acrylonitrile, of itaconic acid.

References Cited

UNITED STATES PATENTS

| | | | |
|---|---|---|---|
| 2,465,319 | 3/1949 | Whinfield et al. | 260—75 |
| 2,779,684 | 1/1957 | Alles | 117—7 |
| 2,884,663 | 5/1959 | Alles | 264—289 |
| 2,968,067 | 1/1961 | Long | 264—289 |
| 3,017,302 | 1/1962 | Hultkrans | 16 |
| 3,048,564 | 8/1962 | Heffelfinger | 260—75 |
| 3,082,117 | 5/1963 | Schilly | 117—76 |
| 3,165,499 | 1/1965 | Alles | 260—75 |
| 3,187,075 | 6/1965 | Seifried et al. | 264—289 |

FOREIGN PATENTS

| | | |
|---|---|---|
| 743,503 | 1/1956 | Great Britain. |
| 577,505 | 6/1959 | Canada. |

WILLIAM D. MARTIN, Primary Examiner

B. D. PIANALTO, Assistant Examiner

U.S. Cl. X.R.

117—122, 138.8; 161—231, 254, 402; 260—33.2, 75